United States Patent
Bayesteh et al.

(10) Patent No.: US 12,040,917 B2
(45) Date of Patent: *Jul. 16, 2024

(54) SENSING-ASSISTED CHANNEL ESTIMATION

(71) Applicants: Alireza Bayesteh, Ottawa (CA); Navid Tadayon, Kanata (CA); Jianglei Ma, Ottawa (CA)

(72) Inventors: Alireza Bayesteh, Ottawa (CA); Navid Tadayon, Kanata (CA); Jianglei Ma, Ottawa (CA)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 0 days.

This patent is subject to a terminal disclaimer.

(21) Appl. No.: 17/748,141

(22) Filed: May 19, 2022

(65) Prior Publication Data

US 2022/0294668 A1   Sep. 15, 2022

Related U.S. Application Data

(63) Continuation of application No. 17/080,917, filed on Oct. 27, 2020, now Pat. No. 11,343,123.

(51) Int. Cl.
*H04L 25/02* (2006.01)
*H04B 7/08* (2006.01)

(52) U.S. Cl.
CPC ....... *H04L 25/0204* (2013.01); *H04B 7/0897* (2013.01); *H04L 25/0212* (2013.01)

(58) Field of Classification Search
CPC ............. H04L 25/0204; H04L 25/0212; H04L 25/0238; H04B 7/0897
See application file for complete search history.

(56) References Cited

U.S. PATENT DOCUMENTS

| | | | |
|---|---|---|---|
| 9,326,295 B1 | 4/2016 | Fay | |
| 10,615,899 B1 | 4/2020 | Bultan | |
| 11,343,123 B2 * | 5/2022 | Bayesteh | ............ H04L 25/0204 |
| 2005/0226140 A1 | 10/2005 | Zhuang et al. | |
| 2006/0035643 A1 | 2/2006 | Vook et al. | |
| 2010/0207804 A1 | 8/2010 | Hayward et al. | |
| 2010/0238984 A1 | 9/2010 | Sayana et al. | |
| 2011/0216682 A1 | 9/2011 | Xu et al. | |
| 2012/0235854 A1 | 9/2012 | Testar | |

(Continued)

FOREIGN PATENT DOCUMENTS

| | | |
|---|---|---|
| CN | 101645865 A | 2/2010 |
| JP | H0818486 A | 1/1996 |

(Continued)

*Primary Examiner* — Kenneth T Lam

(57) ABSTRACT

Some embodiments of the present disclosure provide for use of a linear chirp signal as a basis for a sensing signal. Modification of the linear chirp signal by a signature function can allow a receiver of the sensing signal to determine an identity for a source of the sensing signal. Accordingly, upon processing the received sensing signal to obtain path parameter estimates, the receiver can direct a transmission of an indication of the path parameter estimates to the source of the sensing signal. Aspects of the present application relate to performing multi-node, multi-path channel estimation on the basis of processing the received sensing signal. Conveniently, the processing is performed with low complexity.

20 Claims, 6 Drawing Sheets

(56) References Cited

U.S. PATENT DOCUMENTS

| | | | |
|---|---|---|---|
| 2012/0269343 A1 | 10/2012 | Hiscock | |
| 2016/0094270 A1 | 3/2016 | Seller | |
| 2016/0261306 A1 | 9/2016 | Seller et al. | |
| 2017/0126271 A1 | 5/2017 | Maclean et al. | |
| 2017/0353210 A1* | 12/2017 | Pratt | H04B 7/0617 |
| 2022/0069860 A1* | 3/2022 | Park | G01S 7/006 |

FOREIGN PATENT DOCUMENTS

| | | |
|---|---|---|
| JP | 2008537590 A | 9/2008 |
| JP | 2012105079 A | 5/2012 |
| JP | 2019514312 A | 5/2019 |
| JP | 2021503791 A | 2/2021 |
| WO | 2020069530 A1 | 4/2020 |
| WO | 2020190183 A1 | 9/2020 |

* cited by examiner

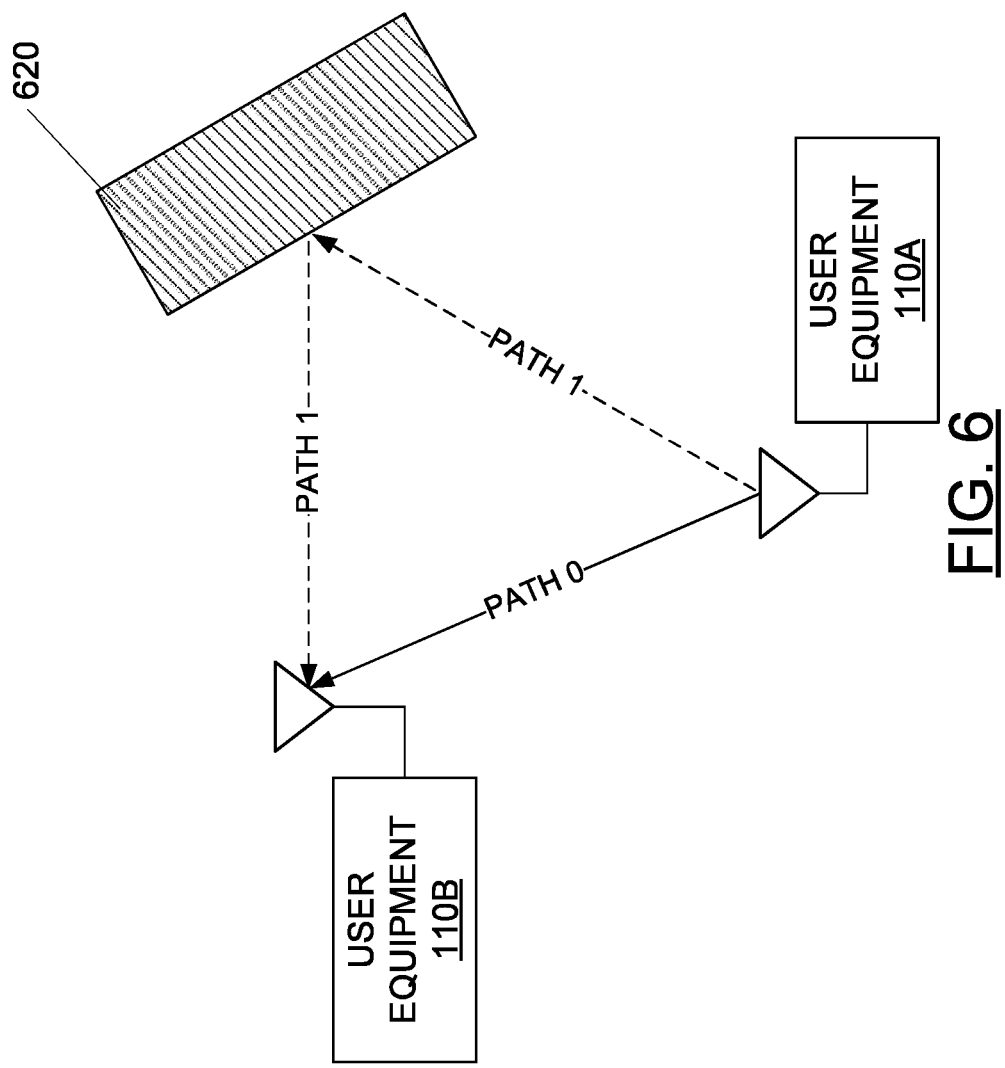

SENSING-ASSISTED CHANNEL ESTIMATION

CROSS REFERENCE TO RELATED APPLICATIONS

The present application is a continuation of U.S. patent application Ser. No. 17/080,917, filed Oct. 27, 2020, the contents of which are hereby incorporated herein by reference.

TECHNICAL FIELD

The present disclosure relates generally to channel estimation and, in particular embodiments, to sensing-assisted channel estimation.

BACKGROUND

In a sensing-enabled network, multiple transmission points (TPs) send sensing signals to obtain information about the targets in the environment.

The transmission points also send reference signals that allow devices in the network to estimate properties of each channel from transmission point to device.

The act of estimating the properties of the channel requires that the device have foreknowledge of the reference signal, so that the device can determine the manner in which the reference signal has been altered by the channel. As the number of transmission points increases and in the presence of multipath channels, the complexity associated with estimating the properties of the various channels can increase to a degree that is beyond the limited processing capabilities of the device.

SUMMARY

Aspects of the present application relate to the use of a linear chirp signal as a basis for a sensing signal. Modification of the linear chirp signal by a signature function can allow a receiver of the sensing signal to determine a source identity for a source of the sensing signal. Accordingly, upon processing the received sensing signal to obtain path parameter estimates, the receiver can direct a transmission of an indication of the path parameter estimates to the source of the sensing signal.

A configurable frequency employed in the signature signal allows the sensing signal to be specific to, and therefore uniquely identify, the transmission point at the source of the sensing signal. A reduced measurement window may be defined for use in the path parameter estimation processing. Advantageously, the processing may be considered to be universal in that the de-chirping and Inverse Fast Fourier Transform (IFFT) allow for obtaining all path parameter estimates all at once.

In aspects of the present application, a reduction in overhead may be realized by exploiting the sensing signals to carry some of the information that would, otherwise, be carried by dedicated reference signals or other control signals used for channel estimation. Conveniently, by accomplishing channel estimation using sensing signals, use of channel estimation pilots may be rendered unnecessary, thereby removing the overhead associated with the use of channel estimation pilots.

According to a first aspect of the present disclosure, there is provided a method of estimating channel parameters for a wireless channel between a transmitter node and a receiver node. The method includes receiving, by the receiver node, an indication of sensing signal parameters of a sensing signal. The method further includes receiving, by the receiver node, the sensing signal, wherein the sensing signal comprises a linear chirp signal. The method further includes transmitting, by the receiver node to the transmitter node, a channel parameter obtained by processing the received sensing signal.

In a further embodiment of the first aspect, the sensing signal parameters comprise a chirp slope value and a frequency offset value of the linear chirp signal. In a further embodiment of the previous embodiment, the frequency offset value is associated with the transmitter node. In a further embodiment of the previous embodiment, the method further includes determining, based on the frequency offset value, an identity of the transmitter node, wherein the transmitting the channel parameter includes transmitting the channel parameter to the transmitter node based on the determined identity.

In a further embodiment of the first aspect or of any previous embodiment, the sensing signal parameters comprise an indication of a reduced measurement window for use during the processing the received sensing signal. In a further embodiment of the first aspect or of any previous embodiment, the processing comprises de-chirping the received sensing signal.

According to a second aspect of the present disclosure, there is provided an apparatus including a processor and a non-transitory memory including instructions that, when executed by the processor, cause the apparatus to implement the method of the first aspect or any embodiment thereof.

According to a third aspect of the present disclosure, there is provided a method of estimating channel parameters for a wireless channel between a transmitter node and a receiver node. The method includes transmitting, by the transmitter node, an indication of sensing signal parameters of a sensing signal. The method further includes transmitting, by the transmitter node, the sensing signal wherein the sensing signal comprises a linear chirp signal. The method further includes receiving, by the transmitter node, a channel parameter from the receiver node.

In a further embodiment of the first aspect, the sensing signal parameters comprise a chirp slope value and a frequency offset value of the linear chirp signal. In a further embodiment of the previous embodiment, the frequency offset value is associated with the transmitter node. In a further embodiment of the first aspect or of any previous embodiment, the sensing signal parameters comprise an indication of a reduced measurement window for use in processing a reception of the transmitted sensing signal.

According to a fourth aspect of the present disclosure, there is provided an apparatus including a processor and a non-transitory memory including instructions that, when executed by the processor, cause the apparatus to implement the method of the third aspect or any embodiment thereof.

BRIEF DESCRIPTION OF THE DRAWINGS

For a more complete understanding of the present embodiments, and the advantages thereof, reference is now made, by way of example, to the following descriptions taken in conjunction with the accompanying drawings, in which:

FIG. 6 illustrates a single sensing signal taking two paths from a first user equipment of FIG. 1 to a second user equipment of FIG. 1.

DETAILED DESCRIPTION OF ILLUSTRATIVE EMBODIMENTS

For illustrative purposes, specific example embodiments will now be explained in greater detail in conjunction with the figures.

The embodiments set forth herein represent information sufficient to practice the claimed subject matter and illustrate ways of practicing such subject matter. Upon reading the following description in light of the accompanying figures, those of skill in the art will understand the concepts of the claimed subject matter and will recognize applications of these concepts not particularly addressed herein. It should be understood that these concepts and applications fall within the scope of the disclosure and the accompanying claims.

Moreover, it will be appreciated that any module, component, or device disclosed herein that executes instructions may include, or otherwise have access to, a non-transitory computer/processor readable storage medium or media for storage of information, such as computer/processor readable instructions, data structures, program modules and/or other data. A non-exhaustive list of examples of non-transitory computer/processor readable storage media includes magnetic cassettes, magnetic tape, magnetic disk storage or other magnetic storage devices, optical disks such as compact disc read-only memory (CD-ROM), digital video discs or digital versatile discs (i.e., DVDs), Blu-ray Disc™, or other optical storage, volatile and non-volatile, removable and non-removable media implemented in any method or technology, random-access memory (RAM), read-only memory (ROM), electrically erasable programmable read-only memory (EEPROM), flash memory or other memory technology. Any such non-transitory computer/processor storage media may be part of a device or accessible or connectable thereto. Computer/processor readable/executable instructions to implement an application or module described herein may be stored or otherwise held by such non-transitory computer/processor readable storage media.

Figure 1:
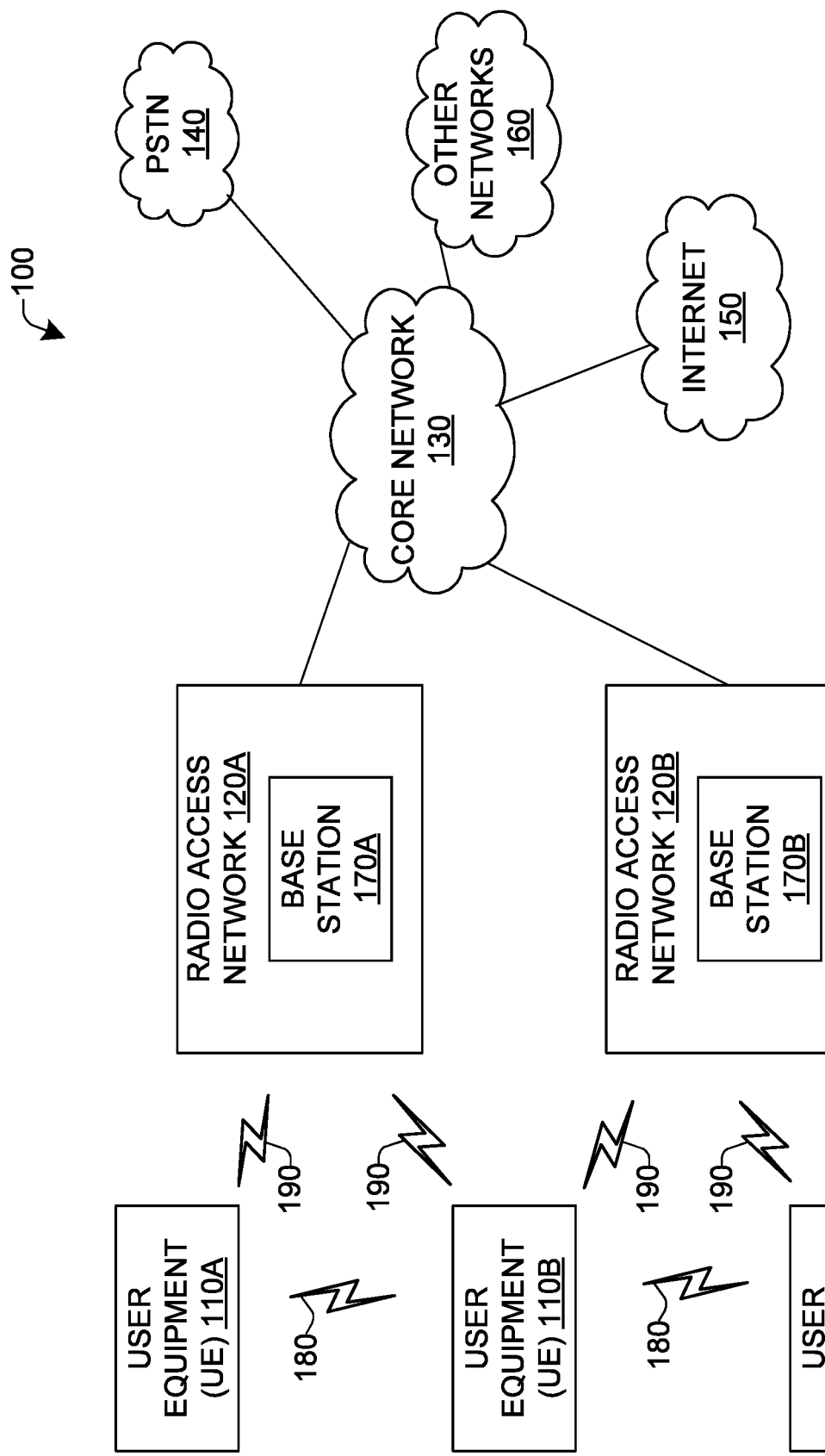
FIG. 1 is a schematic diagram of a communication system in which embodiments of the disclosure may occur, the communication system includes an example user equipment and an example base station.

FIG. 1 illustrates, in a schematic diagram, an example communication system 100. In general, the communication system 100 enables multiple wireless or wired elements to communicate data and other content. The purpose of the communication system 100 may be to provide content (voice, data, video, text) via broadcast, narrowcast, user device to user device, etc. The communication system 100 may operate efficiently by sharing resources, such as bandwidth.

In this example, the communication system 100 includes a first user equipment (UE) 110A, a second UE 110B and a third UE 110C (individually or collectively 110), a first radio access network (RAN) 120A and a second RAN 120B (individually or collectively 120), a core network 130, a public switched telephone network (PSTN) 140, the Internet 150 and other networks 160. Although certain numbers of these components or elements are shown in FIG. 1, any reasonable number of these components or elements may be included in the communication system 100.

The UEs 110 are configured to operate, communicate, or both, in the communication system 100. For example, the UEs 110 are configured to transmit, receive, or both via wireless communication channels. Each UE 110 represents any suitable end user device for wireless operation and may include such devices (or may be referred to) as a wireless transmit/receive unit (WTRU), a mobile station, a mobile subscriber unit, a cellular telephone, a station (STA), a machine-type communication device (MTC), an Internet of Things (IoT) device, a personal digital assistant (PDA), a smartphone, a laptop, a computer, a touchpad, a wireless sensor or a consumer electronics device.

In FIG. 1, the first RAN 120A includes a first base station 170A and the second RAN includes a second base station 170B (individually or collectively 170). The base station 170 may also be called an anchor or a transmit point (TP). Each base station 170 is configured to wirelessly interface with one or more of the UEs 110 to enable access to any other base station 170, the core network 130, the PSTN 140, the internet 150 and/or the other networks 160. For example, the base stations 170 may include (or be) one or more of several well-known devices, such as a base transceiver station (BTS), a Node-B (NodeB), an evolved NodeB (eNodeB), a Home eNodeB, a gNodeB, a transmission and receive point (TRP), a site controller, an access point (AP) or a wireless router. Any UE 110 may alternatively or additionally be configured to interface, access or communicate with any other base station 170, the internet 150, the core network 130, the PSTN 140, the other networks 160 or any combination of the preceding. The communication system 100 may include RANs, such as the RAN 120B, wherein the corresponding base station 170B accesses the core network 130 via the internet 150, as shown.

The UEs 110 and the base stations 170 are examples of communication equipment that can be configured to implement some or all of the functionality and/or embodiments described herein. In the embodiment shown in FIG. 1, the first base station 170A forms part of the first RAN 120A, which may include other base stations (not shown), base station controller(s) (BSC, not shown), radio network controller(s) (RNC, not shown), relay nodes (not shown), elements (not shown) and/or devices (not shown). Any base station 170 may be a single element, as shown, or multiple elements, distributed in the corresponding RAN 120, or otherwise. Also, the second base station 170B forms part of the second RAN 120B, which may include other base stations, elements and/or devices. Each base station 170 transmits and/or receives wireless signals within a particular geographic region or area, sometimes referred to as a "cell" or "coverage area." A cell may be further divided into cell sectors and a base station 170 may, for example, employ multiple transceivers to provide service to multiple sectors. In some embodiments, there may be established pico or femto cells where the radio access technology supports such. In some embodiments, multiple transceivers could be used for each cell, for example using multiple-input multiple-output (MIMO) technology. The number of RANs 120 shown is exemplary only. Any number of RANs may be contemplated when devising the communication system 100.

The base stations 170 communicate with one or more of the UEs 110 over one or more air interfaces 190 using wireless communication links, e.g., radio frequency (RF) wireless communication links, microwave wireless communication links, infrared (IR) wireless communication links, visible light (VL) communications links, etc. The air interfaces 190 may utilize any suitable radio access technology. For example, the communication system 100 may implement one or more orthogonal or non-orthogonal channel access methods, such as code division multiple access (CDMA), time division multiple access (TDMA), frequency division multiple access (FDMA), space division multiple access (SDMA), orthogonal FDMA (OFDMA) or single-carrier FDMA (SC-FDMA) in the air interfaces 190.

A base station 170 may implement Universal Mobile Telecommunication System (UMTS) Terrestrial Radio Access (UTRA) to establish the air interface 180 using wideband CDMA (WCDMA). In doing so, the base station 170 may implement protocols such as High Speed Packet Access (HSPA), Evolved HPSA (HSPA+) optionally including High Speed Downlink Packet Access (HSDPA), High Speed Packet Uplink Access (HSUPA) or both. Alternatively, a base station 170 may establish the air interface 180 with Evolved UTMS Terrestrial Radio Access (E-UTRA) using LTE, LTE-A, LTE-B and/or 5G New Radio (NR). It is contemplated that the communication system 100 may use multiple channel access functionality, including such schemes as described above. Other radio technologies for implementing air interfaces include IEEE 802.11, 802.15, 802.16, CDMA2000, CDMA2000 1x, CDMA2000 EV-DO, IS-2000, IS-95, IS-856, GSM, EDGE and GERAN. Of course, other multiple access schemes and wireless protocols may be utilized.

The RANs 120 are in communication with the core network 130 to provide the UEs 110 with various services such as voice communication services, data communication services and other communication services. The RANs 120 and/or the core network 130 may be in direct or indirect communication with one or more other RANs (not shown), which may or may not be directly served by the core network 130 and may or may not employ the same radio access technology as the first RAN 120A, the second RAN 120B or both. The core network 130 may also serve as a gateway access between (i) the RANs 120 or the UEs 110 or both, and (ii) other networks (such as the PSTN 140, the Internet 150 and the other networks 160).

The UEs 110 may communicate with one another over one or more sidelink (SL) air interfaces 180 using wireless communication links, e.g., radio frequency (RF) wireless communication links, microwave wireless communication links, infrared (IR) wireless communication links, visible light (VL) communications links, etc. The SL air interfaces 180 may utilize any suitable radio access technology and may be substantially similar to the air interfaces 190 over which the UEs 110 communicate with one or more of the base stations 170 or they may be substantially different. For example, the communication system 100 may implement one or more channel access methods, such as CDMA, TDMA, FDMA, SDMA, OFDMA or SC-FDMA in the SL air interfaces 180. In some embodiments, the SL air interfaces 180 may be, at least in part, implemented over unlicensed spectrum.

Some or all of the UEs 110 may include functionality for communicating with different wireless networks over different wireless links using different wireless technologies and/or protocols. Instead of wireless communication (or in addition thereto), the UEs 110 may communicate via wired communication channels to a service provider or a switch (not shown) and to the Internet 150. The PSTN 140 may include circuit switched telephone networks for providing plain old telephone service (POTS). The Internet 150 may include a network of computers and subnets (intranets) or both and incorporate protocols, such as internet protocol (IP), transmission control protocol (TCP) and user datagram protocol (UDP). The UEs 110 may be multimode devices capable of operation according to multiple radio access technologies and incorporate multiple transceivers necessary to support multiple radio access technologies.

Figure 2:
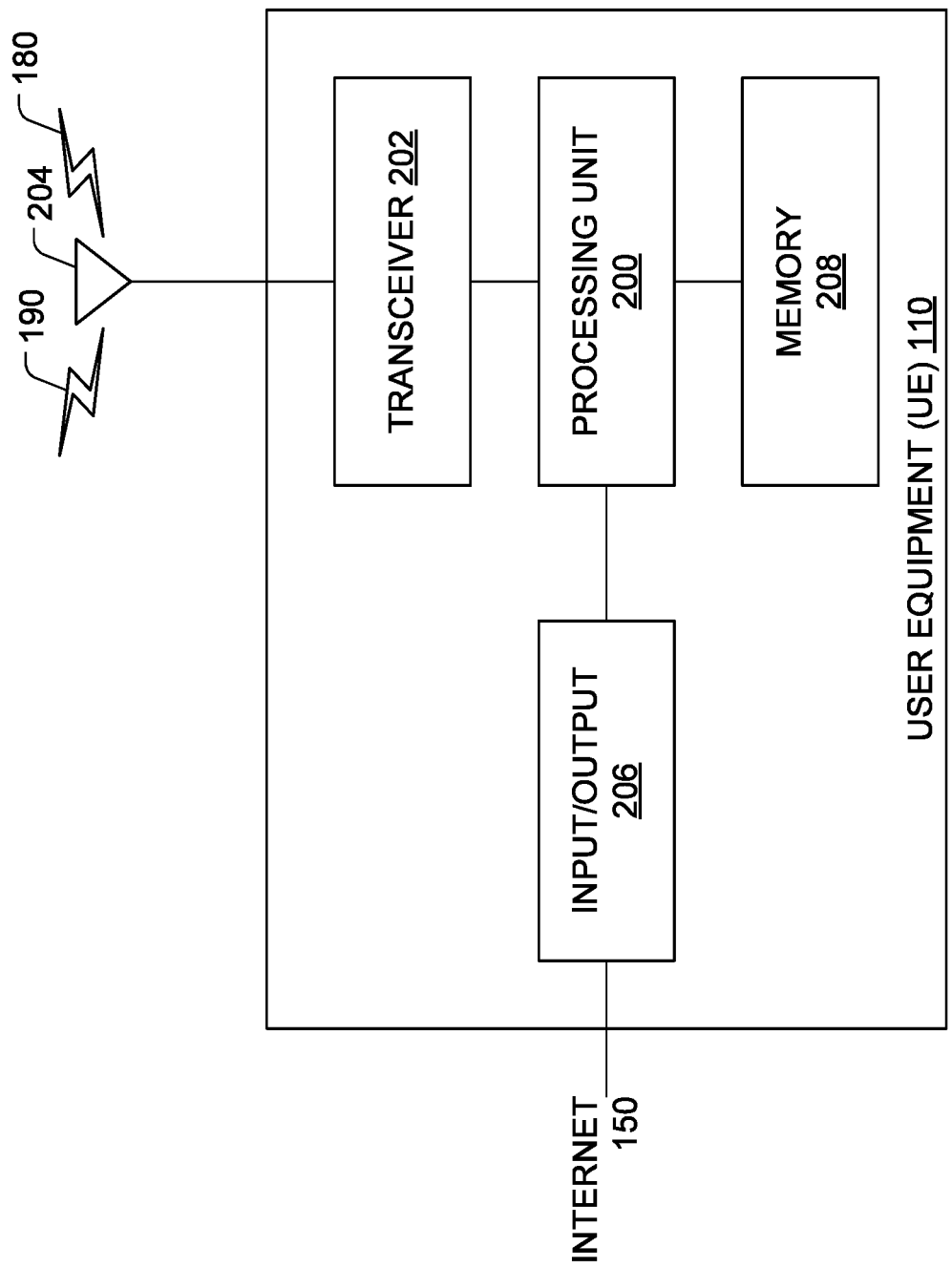
FIG. 2 illustrates, in a block diagram, an example user equipment of the communication system of FIG. 1, in accordance with aspects of the present application.
Figure 3:
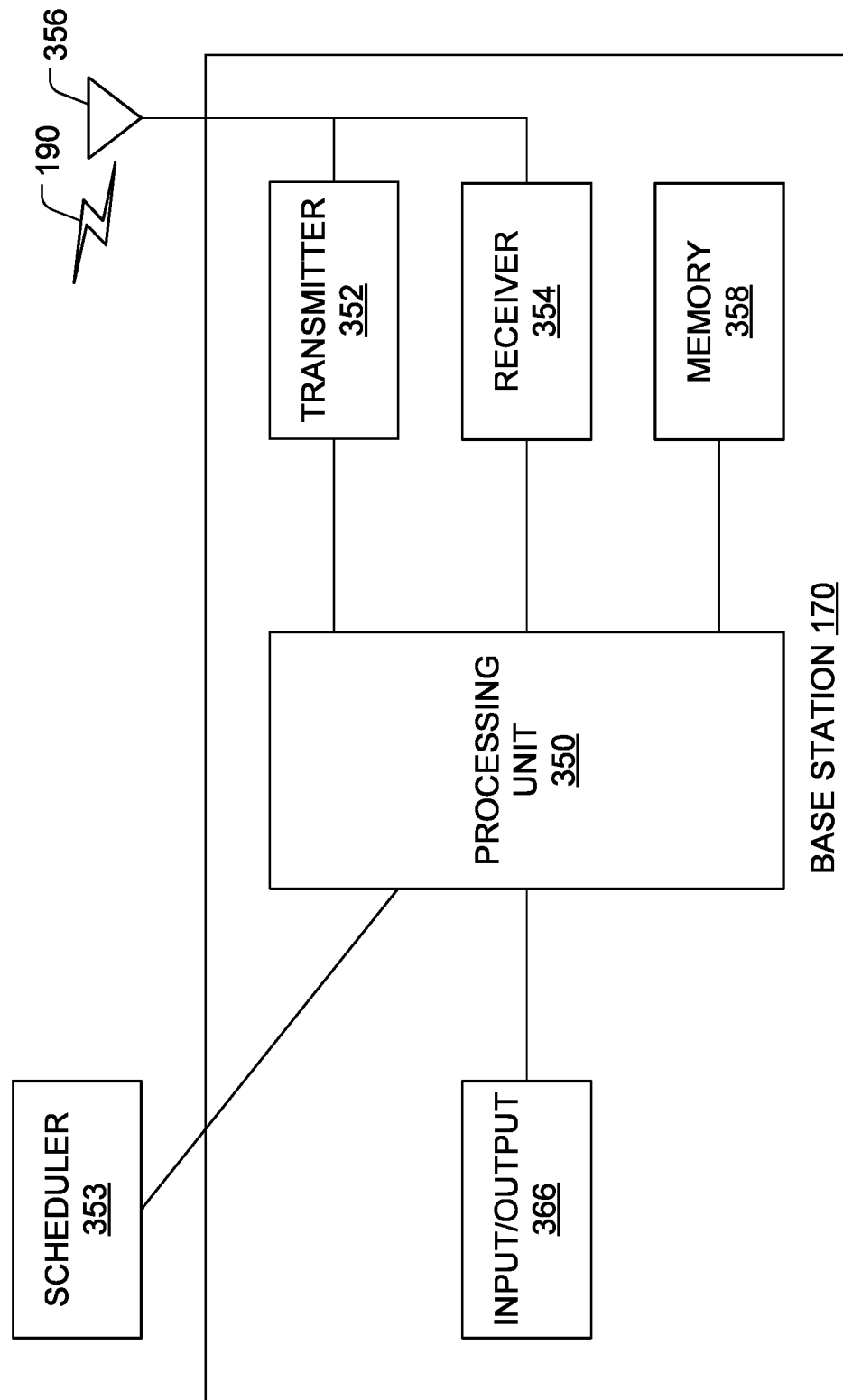
FIG. 3 illustrates, in a block diagram, an example base station of the communication system of FIG. 1, in accordance with aspects of the present application.

FIGS. 2 and 3 illustrate example devices that may implement the methods and teachings according to this disclosure. In particular, FIG. 2 illustrates an example UE 110 and FIG. 3 illustrates an example base station 170. These components could be used in the communication system 100 of FIG. 1 or in any other suitable system.

As shown in FIG. 2, the UE 110 includes at least one UE processing unit 200. The UE processing unit 200 implements various processing operations of the UE 110. For example, the UE processing unit 200 could perform signal coding, data processing, power control, input/output processing, or any other functionality enabling the UE 110 to operate in the communication system 100. The UE processing unit 200 may also be configured to implement some or all of the functionality and/or embodiments described in more detail above. Each UE processing unit 200 includes any suitable processing or computing device configured to perform one or more operations. Each UE processing unit 200 could, for example, include a microprocessor, microcontroller, digital signal processor, field programmable gate array, or application specific integrated circuit.

The UE 110 also includes at least one transceiver 202. The transceiver 202 is configured to modulate data or other content for transmission by at least one antenna or Network Interface Controller (NIC) 204. The transceiver 202 is also configured to demodulate data or other content received by the at least one antenna 204. Each transceiver 202 includes any suitable structure for generating signals for wireless or wired transmission and/or processing signals received wirelessly or by wire. Each antenna 204 includes any suitable structure for transmitting and/or receiving wireless or wired signals. One or multiple transceivers 202 could be used in the UE 110. One or multiple antennas 204 could be used in the ED 110. Although shown as a single functional unit, a transceiver 202 could also be implemented using at least one transmitter and at least one separate receiver.

The UE 110 further includes one or more input/output devices 206 or interfaces (such as a wired interface to the Internet 150). The input/output devices 206 permit interaction with a user or other devices in the network. Each input/output device 206 includes any suitable structure for providing information to or receiving information from a user, such as a speaker, microphone, keypad, keyboard, display, or touch screen, including network interface communications.

In addition, the UE 110 includes at least one UE memory 208. The UE memory 208 stores instructions and data used, generated, or collected by the ED 110. For example, the UE memory 208 could store software instructions or modules configured to implement some or all of the functionality and/or embodiments described above and that are executed by the UE processing unit(s) 200. Each UE memory 208 includes any suitable volatile and/or non-volatile storage and retrieval device(s). Any suitable type of memory may be used, such as random access memory (RAM), read only memory (ROM), hard disk, optical disc, subscriber identity module (SIM) card, memory stick, secure digital (SD) memory card, and the like.

As shown in FIG. 3, the base station 170 includes at least one BS processing unit 350, at least one transmitter 352, at least one receiver 354, one or more antennas 356, at least one BS memory 358, and one or more input/output devices or interfaces 366. A transceiver, not shown, may be used instead of the transmitter 352 and receiver 354. A scheduler 353 may be coupled to the BS processing unit 350. The scheduler 353 may be included within or operated separately from the base station 170. The BS processing unit 350 implements various processing operations of the base station 170, such as signal coding, data processing, power control, input/output processing, or any other functionality. The BS processing unit 350 can also be configured to implement some or all of the functionality and/or embodiments described in more detail above. Each BS processing unit 350 includes any suitable processing or computing device configured to perform one or more operations. Each BS processing unit 350 could, for example, include a microprocessor, microcontroller, digital signal processor, field programmable gate array, or application specific integrated circuit.

Each transmitter 352 includes any suitable structure for generating signals for wireless or wired transmission to one or more UEs or other devices. Each receiver 354 includes any suitable structure for processing signals received wirelessly or by wire from one or more UEs or other devices. Although shown as separate components, at least one transmitter 352 and at least one receiver 354 could be combined into a transceiver. Each antenna 356 includes any suitable structure for transmitting and/or receiving wireless or wired signals. Although a common antenna 356 is shown here as being coupled to both the transmitter 352 and the receiver 354, one or more antennas 356 could be coupled to the transmitter(s) 352, and one or more separate antennas 356 could be coupled to the receiver(s) 354. Each BS memory 358 includes any suitable volatile and/or non-volatile storage and retrieval device(s) such as those described above in connection to the UE 110. The BS memory 358 stores instructions and data used, generated, or collected by the base station 170. For example, the BS memory 358 could store software instructions or modules configured to implement some or all of the functionality and/or embodiments described above and that are executed by the BS processing unit(s) 350.

Each input/output device 366 permits interaction with a user or other devices in the network. Each input/output device 366 includes any suitable structure for providing information to or receiving/providing information from a user, including network interface communications.

Figure 4:
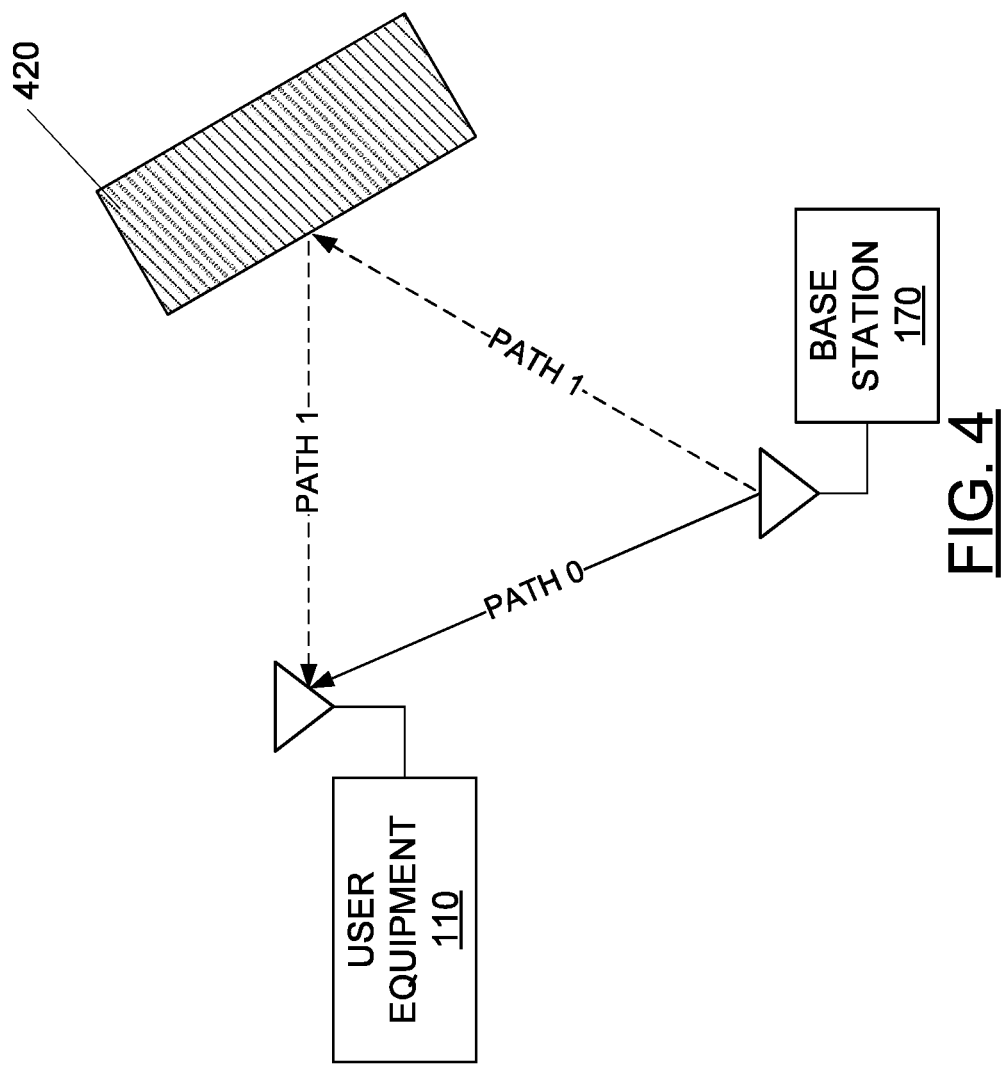
FIG. 4 illustrates a single sensing signal taking two paths from the example base station of FIG. 3 to the example user equipment of FIG. 2.

FIG. 4 illustrates a single sensing signal taking two paths to the UE 110. One path (a path with an index "0") is a line-of-sight (LOS) path. One path (a path with an index "1") includes a reflection from a target 420. In aspects of the present application, UEs 110 can be configured to receive and perform measurements on the same sensing signal received over distinct paths. The configuration of the UE 110 for such activities may, for example, be accomplished through signaling from the BS 170, or some other entity in the network 100 of FIG. 1.

In overview, aspects of the present application relate to obtaining estimates of useful information, such as downlink channel parameters, by performing measurements on the received sensing signals. The transmission of the sensing signal may be considered to be a portion of an overhead that affects the overall efficiency of communication in the network 100 of FIG. 1. In aspects of the present application, a reduction in other overhead may be realized by exploiting the sensing signals to carry some of the information that would, otherwise, be carried by further signals and be responsible for another portion of the other overhead.

In aspects of the present application, the UE 110 estimates downlink (DL) channel parameters based on receiving and processing the sensing signal. In a preferred embodiment, the sensing signal is a linear chirp signal with bandwidth B and time duration T. Such a linear chirp signal is generally known from its use in Frequency Modulated Continuous Wave (FMCW) radar systems. A linear chirp signal is defined by an increase in frequency from an initial frequency, $f_{chirp0}$, at an initial time, $t_{chirp0}$, to a final frequency, $f_{chirp1}$, at a final time, $t_{chirp1}$ where the relation between the frequency (f) and time (t) can be expressed as a linear relation of $f-f_{chirp0}=\alpha(t-t_{chirp0})$, where $$\alpha = \frac{f_{chirp1} - f_{chirp0}}{t_{chirp1} - t_{chirp0}}$$

is defined as the chirp slope. The bandwidth of the linear chirp signal may be defined as $B=f_{chirp1}-f_{chirp0}$ and the time duration of the linear chirp signal may be defined as $T=t_{chirp1}-t_{chirp0}$. Such linear chirp signal can be presented as $e^{j\pi\alpha t^2}$ in the baseband representation.

A reason for using a linear chirp signal for aspects of the present application is that the waveform of a linear chirp signal has been shown to have several benefits over other candidate waveforms when hardware imperfections are taken into account. Examples of other candidate waveforms include those waveforms used in CP-OFDM.

In LTE/NR, channel estimation is performed by sending pilot sequences over a number of resource elements. The pilot sequences are also known as reference signals. Example known reference signals include: Demodulation Reference Signal (DMRS); Channel State Information Reference Signal (CSI-RS); and Cell Specific Reference Signal (CRS).

In these known approaches, properties of the channel can be estimated on the basis of processing the received pilot sequences. The processing may include performing smoothing filtering techniques to reduce the noise variance in the estimated properties. It is known that there are a couple of issues with these known approaches. In a first issue, multi-node channel estimation may be considered to be challenging. In multi-node channel estimation, the receiver needs to know the reference signal sequences of all nodes simultaneously transmitting. Alternatively, in so-called "blind detection," the receiver only knows a list of potential transmitting nodes. It can be shown that blind detection is very complex. In a second issue, interference with the simultaneously-transmitted pilot signals can degrade the performance of the processing of the pilot signals. There exist techniques to deal with the interference; however, the techniques are associated with a high degree of complexity.

From a theoretical perspective, it can be shown that a delta-like pilot signal is desirable for estimating properties of a multi-path channel. Indeed, delta-like pilot signals can flexibly accommodate multi-node channel estimation by time-shifting. It can be shown that delta-like pilot signals are neither good for communications nor good for sensing.

Aspects of the present application relate to performing multi-node, multi-path channel estimation on the basis of processing a received sensing signal. Conveniently, the processing is performed with low complexity.

In some aspects of the present application, the sensing signal is designed to be node-specific. That is, the sensing signal is specific to the base station 170 that transmits the sensing signal. The node-specific nature of the sensing signal may be accomplished through use of configurable frequency steps or offsets.

In some aspects of the present application, a measurement window may be defined for the channel estimation carried out at the UE 110.

In some aspects of the present application, a universal decoder is implemented, at the UE 110, by the UE processing unit 200. The universal decoder may be configured to perform a de-chirping operation and an Inverse Fast Fourier Transform (IFFT) operation to, thereby, obtain all channel parameters in one shot.

A node-specific sensing signal in accordance with aspects of the present application can be expressed as $x(t)=a(t)e^{j\pi\alpha t^2}$, where a(t) is a "signature function." The signature function is used to make the sensing signal, x(t), specific to the BS 170 that transmits the sensing signal. Additionally, the parameter α may be referenced as a chirp slope parameter. The chirp slope parameter is related to the bandwidth, B, and the period, T, by the relationship, $$\alpha = \frac{B}{T}.$$

The channel is assumed to be a multi-path channel with impulse response given by $$h(t) = \sum_{l=1}^{L-1} \beta_l \delta(t - \tau_l)$$

where $\beta_l$ is a channel attenuation parameter for the $l^{th}$ path and $\tau_l$ is a channel delay parameter for the $l^{th}$ path.

In this case, the received signal, y(t), may be represented as a time domain convolution of the transmitted signal, x(t), and the channel impulse response, h(t), such that y(t)=x(t)*h(t), wherein the operator * denotes the convolution operation. It follows that the received signal, y(t), can be written as:

$$y(t) = \sum_{l=0}^{L-1} \beta'_l a(t - \tau_l) e^{j\pi\alpha(t-\tau_l)^2}$$

where $\beta'_l = \beta_l e^{j\pi\alpha\tau_l^2}$. Accordingly, each path, among the plurality, L, of paths from the BS 170 to the UE 110, results in a delay of $\tau_l$ and a frequency shift of $\alpha\tau_l$.

Aspects of the present application involve adding a prefix to the sensing signal. The BS 170 may determine the sensing signal that is to be transmitted and then insert a part of the determined sensing signal at the beginning of the sensing signal. Conveniently, insertion of a part of the determined sensing signal at the beginning of the sensing signal may be shown to cause a sensing signal received over distinct paths to be continuous in time and this makes the channel parameter estimation possible.

However, only for certain classes of signature function, a(t), inserting a prefix is equivalent to continuing the chirp signal over the larger period without phase discontinuity. A lack of phase discontinuity may be shown to be beneficial in the context of sensing performance. The exponential function may be shown to be in a class of signature function for which inserting a prefix is equivalent to continuing the chirp signal over a period larger than the established duration, T, of the linear chirp signal without phase discontinuity. For these classes of signature function, inserting a prefix may be viewed as equivalent to keeping the original sensing signal and defining a reduced measurement window for use by the receiver end (the UE 110 end) of the communication link over which the channel parameter estimation should be performed.

In view of the foregoing, the signature function, a(t), may be designed as $a(t)=e^{j2\pi f_i t}$, where $f_i$ is a configurable frequency. Indeed, $f_i$ may be considered to be the node-specific feature (i.e., the feature specific to the BS 170) of the sensing signal, x(t). The configurable frequency, $f_i$, that is associated with the $i^{th}$ BS 170 may be found by adding a number of frequency steps, Δf, to a base frequency, $f_{base}$.

It may be shown that, when the sensing signal transmitted by the BS 170 has a feature that is specific to the BS 170, and when many BSs 170 are transmitting respective sensing signal all at once, the UE 110 may perform simultaneous multi-node channel estimation.

Since the sensing signal with a feature that is specific to the BS 170 has the same properties as the sensing signal without a feature that is specific to the BS 170, it can be shown that the addition of the feature that is specific to the BS 170 does not degrade the sensing performance.

Figure 5:
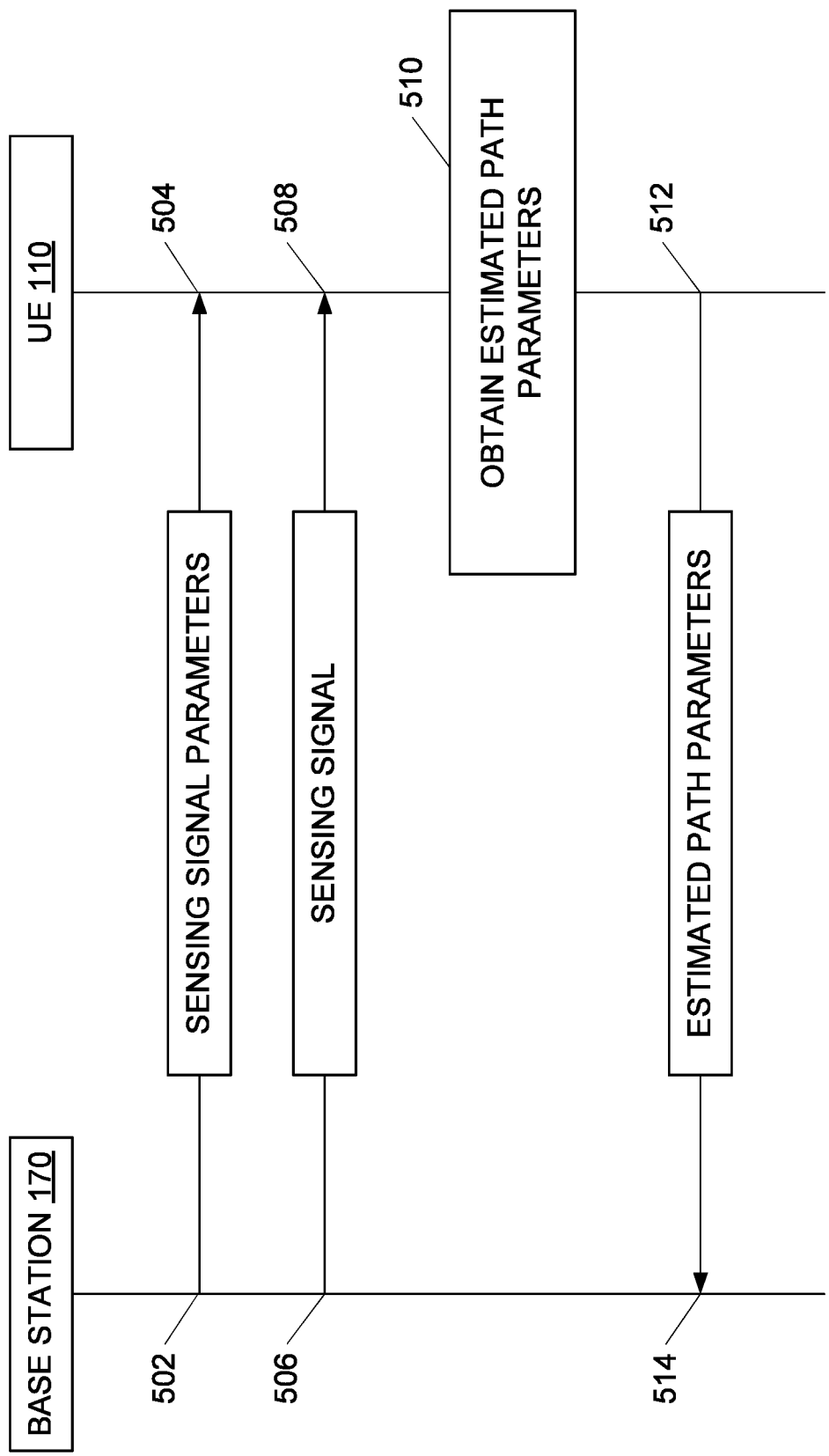
FIG. 5 illustrates, in a signal flow diagram, an exchange of signals between the example base station of FIG. 3 and the example user equipment of FIG. 2.

FIG. 5 illustrates, in a signal flow diagram, an exchange of signals between the base station 170 and the UE 110. Initially, the BS 170 transmits (step 502), to the UE 110, an indication of parameters that are to be used when the BS 170 is transmitting a sensing signal (step 506). For example, the sensing signal parameters may indicate a frequency offset value associated with the transmitter node (BS 170). For another example, the sensing signal parameters may indicate a chirp slope value. For another example, the sensing signal parameters may indicate a reduced measurement window for use during the processing of the received sensing signal. The UE 110 receives (step 504) the sensing signal parameters and records the sensing signal parameters in the UE memory 208.

Subsequently, the BS 170 transmits (step 506) the sensing signal, x(t). The UE 110 receives (step 508) the sensing signal as perturbed by at least one channel. In an embodiment, the sensing signal includes a linear chirp signal. The linear chirp signal may have a frequency offset value associated with the transmitter node.

Upon receiving (step 508) the sensing signal, the UE 110 processes the received sensing signal to obtain (step 510) estimated path parameters for each path between the BS 170 and the UE 110.

For example, the processing of the received sensing signal, y(t), at the UE 110 involves de-chirping the received sensing signal, y(t), by multiplying by $e^{-j\pi\alpha t^2}$, thereby giving a de-chirped received signal, z(t). The de-chirped received signal, z(t), may be expressed as:

$$z(t) = y(t)e^{-j\pi\alpha t^2} = \sum_{l=0}^{L-1} \beta''_l e^{j2\pi(f_i - \alpha\tau_l)t}.$$

where $\beta''_l = \beta_l e^{j\pi(\alpha\tau_l^2 - 2f_i\tau_l)}$.

The configurable frequency, $f_i$, that is specific to the BS 170, may be defined as $$f_i = \frac{-N_i}{T},$$

where the term $N_i$ is also specific to the BS 170. Using the definition of the chirping coefficient, $$\alpha = \frac{B}{T},$$

the expression for the de-chirped received signal, z(t), may be revised to:

$$z(t) = \sum_{l=0}^{L-1} \beta''_l e^{-j2\pi \frac{N_i + B\tau_l}{T} t}.$$

The revised expression for de-chirped received signal, z(t), may be understood to correspond to a sparse OFDM signal that uses L subcarriers from among N subcarriers.

The processing of the received sensing signal, y(t), at the UE 110 also involves taking time domain samples of the de-chirped received signal, z(t). The term $B\tau_l$ may be assumed to be an integer number. Under such circumstances, where $N_l = N_i + B\tau_l$.

$$z_k = z\left(\frac{kT}{N}\right) = \sum_{l=0}^{L-1} \beta''_l e^{-j2\pi \frac{N_l}{N} k},$$

The processing, at the UE 110, also involves subjecting the sampled de-chirped received signal, $z_k$, to IFFT. From the output of the IFFT, the UE 110 may obtain a value for each of $\beta''_l$ and $N_l$.

From the values obtained for $\beta''_l$ and $N_l$, the UE 110 may obtain a value for the number of paths, L, which is also known as "Channel Rank."

From the value for $N_l$, the UE 110 may obtain a value for the delay, $\tau_l$, associated with the $l^{th}$ channel, l=0, 1, ..., L−1, using $$\tau_l = \frac{N_l - N_i}{B}.$$

From the value for $\beta''_l$, the UE 110 may obtain a value for the channel coefficient $\beta_l$, associated with the $l^{th}$ channel, l=0, 1, ..., L−1, using $\beta_l = \beta''_l e^{-j\pi(\alpha \tau_l^2 - 2f_i \tau_l)}$.

From the value of $f_i$, received among the sensing signal parameters received in step 504 (FIG. 5), the UE 110 may determine a source identity for the source of the sensing signal received in step 508. The UE 110 may then transmit (step 512) an indication of estimates for the path parameters $\beta_l$ and $\tau_l$ to the BS 170, where the BS 170 is the source whose identity is evident to the UE 110 from the value of $f_i$. The BS 170 then receives (step 514) the indication of estimates for the path parameters $\beta_l$ and $\tau_l$.

Rather than transmitting (step 512) an indication of estimates for the path parameters $\beta_l$ and $\tau_l$ to the BS 170, the UE 110 may transmit an indication of estimates for the path parameters $\beta_l$ and $\tau_l$ to another recipient element (not shown) of the network 100 of FIG. 1, along with an indication of the configurable frequency, $f_i$, with which the path parameter estimates are associated. The recipient element may associate the path parameter estimates with a path to the UE 110 from the BS 170 that corresponds to the configurable frequency, $f_i$.

In some embodiments, the UE 110 may not know the configurable frequency values, $f_i$. In such a case, the UE 110 may only obtain a value for parameters $\beta''_l$ and $N_l$ associated with the $l^{th}$ channel, l=0, 1, ..., L−1 and send an indication of estimates for the path parameters $\beta''_l$ and $N_l$ to the BS 170 or another recipient element (not shown) of the network 100 of FIG. 1. In this case, the BS 170 or the recipient element may obtain a value for the delay, $\tau_l$, associated with the $l^{th}$ channel, l=0, 1, ..., L−1, using $$\tau_l = \frac{N_l - N_i}{B}.$$

The BS 170 or the recipient element may also obtain a value for the channel coefficient, associated with the $l^{th}$ channel, l=0, 1, ..., L−1, using $\beta_l = \beta''_l = \beta_l e^{j\pi(\alpha \tau_l^2 - 2f_i \tau_l)}$. When determining an estimate for it is helpful that, in contrast to the UE 110, the BS 170 or the recipient element knows the configurable frequency, h. The BS 170 or the recipient element may then associate the path parameter estimates for $\beta_l$ and $\tau_l$ with a path to the UE 110 from the BS 170 that corresponds to the configurable frequency, $f_i$.

Although the preceding is presented in the context of a single sensing signal from a single BS 170, it should be clear that the UE 110 is capable of estimating path parameters for sensing signals simultaneously received over multiple paths from a plurality of BSs 170.

For Nyquist sampling, N=BT. The accuracy of the obtained values can further be improved by oversampling. For oversampling, $N_{samp}$=rN, where r>1 denotes an oversampling ratio. In this case $$z_k = z\left(\frac{kT}{N_{samp}}\right) = \sum_{l=0}^{L-1} \beta''_l e^{-j2\pi \frac{N_l}{N_{samp}} k}.$$

In some embodiments, low-capability UEs 110 can perform undersampling, in which $N_{samp}$=rN, and r<1 denotes an undersampling ratio. In this case $$z_k = z\left(\frac{kT}{N_{samp}}\right) = \sum_{l=0}^{L-1} \beta''_l e^{-j2\pi \frac{N_l}{N_{samp}} k}.$$

In some embodiments, other detection technique can be used. Since the de-chirped received signal, z(t), is sparse by nature, compressed sensing techniques can be used to obtain the path parameter estimates $\{\beta_l, \tau_l\}_{l=0}^{L-1}$.

Conveniently, by accomplishing channel estimation using sensing signals, use of channel estimation pilots may be rendered unnecessary, thereby removing the overhead associated with the use of channel estimation pilots.

In contrast to other channel estimation schemes, the UE 110 in aspects of the present application does not need to know which BS 170 among multiple BSs 170 is actively transmitting sensing signals. Indeed, the UE 110 does not need to have information identifying which DL channel it is measuring. Furthermore, the UE 110 does not need to know the attributes of the sensing signal and the features of the sensing signal that are specific to the BS 170. The UE 110 simply determines the path parameter estimates and transmits an indication of the path parameter estimates to a network entity. The network entity can determine the individual DL channel to which the received path parameter estimates correspond based on the mapping of $f_i$ to the BSs 170 (or sensing nodes in general).

Aspects of the present application allow the UE 110 to determine path parameter estimates for an SL channel in those instances wherein a sensing signal is transmitted by another UE 110. Such an instance is illustrated in FIG. 6, which includes a first UE 110A, a second UE 110B and a target 620. FIG. 6 illustrates a single sensing signal taking two paths from the first UE 110A to the second UE 110B. One path (a path with an index "0") is a line-of-sight (LOS) path. One path (a path with an index "1") includes a reflection from the target 620. In aspects of the present application, the second UE 110B can be configured to receive and perform measurements on the same sensing signal received over distinct paths. The configuration of the second UE 110B for such activities may, for example, be accomplished through signaling from the first UE 110A, or some other entity in the network 100 of FIG. 1.

The signal flow diagram of FIG. 5 may be adapted to represent an exchange of signals between the first UE 110A and the second UE 110B. Initially, the first UE 110A transmits (step 502), to the second UE 110B, an indication of parameters that are to be used when the first UE 110A is transmitting a sensing signal (step 506). The second UE 110B receives (step 504) the sensing signal parameters. Subsequently, the first UE 110A transmits (step 506) the sensing signal, x(t). The second UE 110B receives (step 508) the sensing signal as perturbed by at least one channel. Upon receiving (step 508) the sensing signal, the second UE 110B processes the received sensing signal to obtain (step 510) estimated path parameters for each path between the first UE 110A and the second UE 110B. In contrast to the UE 110 of FIG. 4 estimating downlink channel parameters, the second UE 110B in FIG. 6 may be understood to estimate sidelink channel parameters.

The complexity of determining the path parameter estimates for one channel according to aspects of the present application is low. Moreover, the complexity does not increase as the number of channels increases. Recall that the sensing signal for all BSs 170 is based on the same linear chirp signal and that the sensing signal is made specific to each BS 170 through the use of a distinct signature function. Accordingly, the de-chirping step is common to the analysis of all received sensing signals. The IFFT step allows the UE 110 to obtain path parameter estimates for each DL channel over which a sensing signal has been received.

In contrast, in one version of the traditional NR channel estimation scheme, the UE 110 needs to have a priori information regarding the RS sequences for each BS 170 if the UE 110 is to obtain channel estimates. In another version of the traditional NR channel estimation scheme, the UE 110 has to perform blind detection to obtain the active sequences. Performing blind detection is known to be very complex.

In review, according to aspects of the present application sensing signal parameters are signaled to the UEs 110. The signaling may be accomplished by a BS 170 (see step 502, FIG. 5) or by another network entity. The signaling may instruct the UE 110 to perform path parameter estimation using methods according to aspects of the present application. The signaling may also indicate a period during which the path parameter estimation should be carried out. The signaling may indicate sensing frequency, beam direction and intervals. The signaling may indicate the sensing frequency band and bandwidth, B, and the time duration, T, of linear chirp signal on which the sensing signal, x(t), is based. The signaling may indicate the base frequency, $f_{base}$, and the size of the frequency offset value, $\Delta f$. The signaling may also indicate the list of frequency values $f_i$, i=1, N for a given number N. Accordingly, the UE 110 does not need to know which $f_i$ corresponds to which BS 170.

The signaling may indicate a size for a reduced measurement window. The size for the reduced measurement window can be a common parameter broadcasted to all UEs 110. The size for the reduced measurement window can also be defined as specific to a particular UE 110 or specific to a group of UEs 110. Indeed, multiple sizes for the reduced measurement window may be defined ahead of time, with each size associated with an index. Each UE 110 may maintain a copy of the size definitions such that the signaling of an indication of a size for a reduced measurement window may simply be accomplished by signaling, to the UE 110, an index to the size that is to be used by the UE 110.

The transmitting (step 502, FIG. 5) of sensing signal parameters can be accomplished using dynamic signaling, e.g., layer 1 (L1) signaling such as Downlink Control Information (DCI) signaling or Sidelink Control Information (SCI). Alternatively, transmitting (step 502, FIG. 5) sensing signal parameters can be accomplished using signaling at a layer that is higher than L1, such as using radio resource control (RRC) signaling or signaling using a control element (CE) in the known media access control (MAC) sublayer, that is, a "MAC-CE."

It should be appreciated that one or more steps of the embodiment methods provided herein may be performed by corresponding units or modules. For example, data may be transmitted by a transmitting unit or a transmitting module. Data may be received by a receiving unit or a receiving module. Data may be processed by a processing unit or a processing module. The respective units/modules may be hardware, software, or a combination thereof. For instance, one or more of the units/modules may be an integrated circuit, such as field programmable gate arrays (FPGAs) or application-specific integrated circuits (ASICs). It will be appreciated that where the modules are software, they may be retrieved by a processor, in whole or part as needed, individually or together for processing, in single or multiple instances as required, and that the modules themselves may include instructions for further deployment and instantiation.

Although a combination of features is shown in the illustrated embodiments, not all of them need to be combined to realize the benefits of various embodiments of this disclosure. In other words, a system or method designed according to an embodiment of this disclosure will not necessarily include all of the features shown in any one of the Figures or all of the portions schematically shown in the Figures. Moreover, selected features of one example embodiment may be combined with selected features of other example embodiments.

Although this disclosure has been described with reference to illustrative embodiments, this description is not intended to be construed in a limiting sense. Various modifications and combinations of the illustrative embodiments, as well as other embodiments of the disclosure, will be apparent to persons skilled in the art upon reference to the description. It is therefore intended that the appended claims encompass any such modifications or embodiments.

What is claimed is:

1. A method of estimating channel parameters for a wireless channel between a transmitter node and a receiver node, the method comprising:
receiving, by the receiver node, an indication of a plurality of sensing signal parameters of a sensing signal, wherein the plurality of sensing signal parameters includes an indication of a reduced measurement window for use during processing the received sensing signal;
receiving, by the receiver node, the sensing signal, wherein the sensing signal includes a linear chirp signal; and
transmitting, by the receiver node to the transmitter node, a channel parameter obtained by processing the received sensing signal.

2. The method of claim 1, wherein the plurality of sensing signal parameters comprise a chirp slope value and a frequency offset value of the linear chirp signal.

3. The method of claim 2, wherein the frequency offset value is associated with the transmitter node.

4. The method of claim 3, further comprising:
determining, based on the frequency offset value, an identity of the transmitter node; and
wherein the transmitting the channel parameter includes transmitting the channel parameter to the transmitter node based on the determined identity.

5. The method of claim 1, wherein the indication of the reduced measurement window for use during the processing the received sensing signal comprises an index.

6. The method of claim 1, wherein the processing comprises de-chirping the received sensing signal.

7. A receiver node adapted for estimating channel parameters for a wireless channel between a transmitter node and the receiver node, the receiver node comprising:
a processor; and
a non-transitory memory including instructions that, when executed by the processor, cause the receiver node to:
receive an indication of indication of a plurality of sensing signal parameters of a sensing signal, wherein the plurality of sensing signal parameters includes an indication of a reduced measurement window for use during processing the received sensing signal;
receive the sensing signal, wherein the sensing signal includes a linear chirp signal; and
transmitting, to the transmitter node, a channel parameter obtained by processing the received sensing signal.

8. The receiver node of claim 7, wherein the sensing signal parameters include a chirp slope value and a frequency offset value of the linear chirp signal.

9. The receiver node of claim 8, wherein the frequency offset value is associated with the transmitter node.

10. The receiver node of claim 9, wherein the non-transitory memory further include instructions that, when executed by the processor, cause the apparatus to:
determine, based on the frequency off value, an identity of the transmitter node; and
transmit the channel parameter to the transmitter node based on the determined identity.

11. The receiver node of claim 7, wherein the indication of the reduced measurement window for use by the processor during the processing the received sensing signal comprises an index.

12. The receiver node of claim 7, wherein the non-transitory memory further include instructions that, when executed by the processor, cause the apparatus to de-chirp the received sensing signal.

13. A method of estimating channel parameters for a wireless channel between a transmitter node and a receiver node, the method comprising:
transmitting, by the transmitter node, an indication of a plurality of sensing signal parameters of a sensing signal, wherein the plurality of sensing signal parameters includes an indication of a reduced measurement window for use during processing the received sensing signal;
transmitting, by the transmitter node, the sensing signal wherein the sensing signal includes a linear chirp signal; and
receiving, by the transmitter node, a channel parameter from the receiver node.

14. The method of claim 13, wherein the plurality of sensing signal parameters comprise a chirp slope value and a frequency offset value of the linear chirp signal.

15. The method of claim 14, wherein the frequency offset value is associated with the transmitter node.

16. The method of claim 13, wherein indication of the reduced measurement window for use in processing a reception of the transmitted sensing signal comprises an index.

17. A transmitter node adapted for facilitating estimation of channel parameters for a wireless channel between a transmitter node and a receiver node, transmitter node comprising:
a processor; and
a non-transitory memory including instructions that, when executed by the processor, cause transmitter node to:
transmit an indication of a plurality of sensing signal parameters of a sensing signal, wherein the plurality of sensing signal parameters includes an indication of a reduced measurement window for use during processing the received sensing signal;
transmit the sensing signal wherein the sensing signal comprises a linear chirp signal; and
receive a channel parameter from the receiver node.

18. The transmitter node of claim 17, wherein the plurality of sensing signal parameters comprise a chirp slope value and a frequency offset value of the linear chirp signal.

19. The transmitter node of claim 18, wherein the frequency offset value is associated with the apparatus.

20. The transmitter node of claim 17, wherein the indication of the reduced measurement window for use in processing a reception of the transmitted sensing signal comprises an index.

* * * * *